US009805416B2

(12) United States Patent
McIntyre et al.

(10) Patent No.: US 9,805,416 B2
(45) Date of Patent: Oct. 31, 2017

(54) METHOD AND SYSTEM TO DETERMINE STATE INCOME TAX LIABILITY

(75) Inventors: Irish X. McIntyre, Cary, NC (US); Alexandre Ziegler, Collonge-Bellerive (CH)

(73) Assignee: Thomson Reuters Global Resources, Baar (CH)

( * ) Notice: Subject to any disclaimer, the term of this patent is extended or adjusted under 35 U.S.C. 154(b) by 1367 days.

(21) Appl. No.: 11/588,067

(22) Filed: Oct. 24, 2006

(65) Prior Publication Data

US 2008/0147527 A1    Jun. 19, 2008

(51) Int. Cl.
  *G06Q 40/00*    (2012.01)
  *G06Q 40/02*    (2012.01)
(52) U.S. Cl.
  CPC .......... *G06Q 40/02* (2013.01); *G06Q 40/123* (2013.12)
(58) Field of Classification Search
  USPC ................................................ 705/31, 30, 7
  See application file for complete search history.

(56) References Cited

U.S. PATENT DOCUMENTS

| | | | | |
|---|---|---|---|---|
| 6,064,983 A | * | 5/2000 | Koehler | 705/31 |
| 2002/0013747 A1 | * | 1/2002 | Valentine et al. | 705/31 |
| 2002/0178039 A1 | * | 11/2002 | Kennedy | 705/7 |
| 2003/0040991 A1 | * | 2/2003 | Kapp | 705/31 |
| 2003/0061131 A1 | * | 3/2003 | Parkan, Jr. | 705/30 |
| 2004/0019541 A1 | * | 1/2004 | William et al. | 705/31 |

OTHER PUBLICATIONS

Survey of Railroad and Utility Taxation Practices Among the States: 2005 Update, at: <http://www.orps.state.ny.us/ref/pubs/railroadutility/section1.htm>, last modified May 17, 2005.*

* cited by examiner

*Primary Examiner* — Shay S Glass
(74) *Attorney, Agent, or Firm* — Duncan Galloway Egan Greewald, PLLC; Kevin T. Duncan

(57) ABSTRACT

A system to determine the tax consequences for one or several special apportionment accounts is described. The example system may include a data collector and an optimizer. The data collector may be configured to obtain information associated with one or more accounts, and a selection of one or more jurisdictions. The optimizer may be configured to automatically determine a suggested combination of special apportionment methods for each jurisdiction.

22 Claims, 18 Drawing Sheets

900

902
Industry: Network ▼
904
Accounts: Access_Delivery (Sales Factor) ▼

Time Period: 2003 ▼ — 906

908

|  | Begin | End |
|---|---|---|
| Everywhere Dollar Amount to Spread |  | 456,654 |

910

| Rules | Total | AK | AL | AR | AZ | CA | CO | GA | HI | IA | ID | IL | IN | KS | KY |
|---|---|---|---|---|---|---|---|---|---|---|---|---|---|---|---|
| Group Special Apportionment Calc. |  | N/A | N/A | N/A | N/A | N/A | N/A | N/A | N/A | N/A | N/A | N/A | N/A | N/A | N/A |
| Cable_Length | Total | AK | AL | AR | AZ | CA | CO | GA | HI | IA | ID | IL | IN | KS | KY |
| Sub-Entity Units (#) | 1,000 | 0 | 0 | 0 | 0 | 575 | 30 | 0 | 0 | 0 | 0 | 0 | 0 | 0 | 0 |
| Legal Entity Ratio (%) |  |  |  |  |  | 57.5000% | 3.0000% |  |  |  |  |  |  |  |  |
| Group Ratio (%) |  |  |  |  |  |  |  |  |  |  |  |  |  |  |  |
| In-State Amount ($) |  |  |  |  |  | 262,576 | 13,700 |  |  |  |  |  |  |  |  |
| NoOfCustomers | Total | AK | AL | AR | AZ | CA | CO | GA | HI | IA | ID | IL | IN | KS | KY |
| Sub-Entity Units (#) | 100 | 0 | 0 | 0 | 0 | 75 | 10 | 0 | 0 | 0 | 0 | 0 | 0 | 0 | 0 |
| Legal Entity Ratio (%) |  |  |  |  |  | 75.0000% |  |  |  |  |  |  |  |  |  |
| Group Ratio (%) |  |  |  |  |  |  |  |  |  |  |  |  |  |  |  |
| In-State Amount ($) |  |  |  |  |  | 342,491 |  |  |  |  |  |  |  |  |  |
| NoOfHelpCalls | Total | AK | AL | AR | AZ | CA | CO | GA | HI | IA | ID | IL | IN | KS | KY |
| Sub-Entity Units (#) | 200 | 0 | 0 | 0 | 0 | 20 | 40 | 0 | 0 | 0 | 0 | 0 | 0 | 0 | 0 |
| Legal Entity Ratio (%) |  |  |  |  |  |  | 20.0000% |  |  |  |  |  |  |  |  |
| Group Ratio (%) |  |  |  |  |  |  |  |  |  |  |  |  |  |  |  |
| In-State Amount ($) |  |  |  |  |  |  | 91,331 |  |  |  |  |  |  |  |  |
| QtyOfGigaB_Uploaded | Total | AK | AL | AR | AZ | CA | CO | GA | HI | IA | ID | IL | IN | KS | KY |
| Sub-Entity Units (#) | 90 | 0 | 0 | 0 | 0 | 90 | 3 | 0 | 0 | 0 | 0 | 0 | 0 | 0 | 0 |
| Legal Entity Ratio (%) |  |  |  |  |  |  |  |  |  |  |  |  |  |  |  |
| Group Ratio (%) |  |  |  |  |  |  |  |  |  |  |  |  |  |  |  |
| In-State Amount ($) |  |  |  |  |  |  |  |  |  |  |  |  |  |  |  |

FIGURE 9

Jurisdictions

Select the jurisdictions in which the optimizer should determine the best special apportionment methods.

In addition, for each selected jurisdiction, specify:
- Whether the optimizer is allowed to exclude special apportionment accounts.
- Whether it should be consistent across all special apportionment accounts within an industry in the jurisdiction.
- Whether it should be consistent across all scenario years.

These settings will apply to all selected industries in all years.    [Find]

| Select ☐ | ID | Name | Allow Exclusion ☐ | Consistent Across Accounts ☐ | Consistent Across Years ☐ |
|---|---|---|---|---|---|
| ☐ | AK | Alaska | ☐ | ☐ | ☐ |
| ☑ | AL | Alabama | ☑ | ☑ | ☑ |
| ☑ | AR | Arkansas | ☑ | ☐ | ☑ |
| ☑ | AZ | Arizona | ☐ | ☑ | ☑ |
| ☑ | CA | California | ☐ | ☑ | ☐ |
| ☑ | CO | Colorado | ☐ | ☐ | ☐ |
| ☑ | CT | Connecticut | ☐ | ☐ | ☐ |
| ☐ | DC | District Of Columbia | ☐ | ☐ | ☐ |
| ☐ | DE | Delaware | ☐ | ☐ | ☐ |

56 items disp

[< Back]  [Next >]  [Cancel]

| General | Results | Constraints |

Time Period: 2003

Statistics

| No. of Combinations Evaluated | 285 |
|---|---|
| Initial Tax Liability | 14,752,583 |
| Reduction In Tax | 528,143 |
| Optimal Tax Liability | 14,224,439 |

Results (Cells where changes are proposed in special apportionment methods are highlighted)
Click Apply to commit the results you have selected.

| Select ☐ | Jurisdiction | Savings ▲ | Access_Delivery | Aircraft | Customer_Center | Helicopter |
|---|---|---|---|---|---|---|
| ☐ | Alabama | 0 | Exclude | Exclude | Exclude | Exclude |
| ☐ | Arizona | 0 | Exclude | Exclude | Exclude | Exclude |
| ☐ | Arkansas | 0 | Exclude | Exclude | Exclude | Exclude |
| ☐ | California | 453,474 | NoOfHelpCalls | NoOfMiles_InState | NoOfHelpCalls | NoOfMiles_InState |
| ☐ | Colorado | 51,660 | Cable_Length | Landing | Cable_Length | Landing |
| ☐ | Connecticut | 0 | Exclude | Exclude | Exclude | NoOfMiles_InState |
| ☐ | Texas | 23,009 | Exclude | Landing | Cable_Length | Landing |
| | Total | 528,143 | | | | |

[ Apply ] [ Discard ] [ Close ]

FIGURE 16

METHOD AND SYSTEM TO DETERMINE STATE INCOME TAX LIABILITY

TECHNICAL FIELD

This application relates a method and system to determine state income tax liability.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many jurisdictions (e.g., states) provide certain industries with special rules on how to compute the numerator amount of some items that must be included in the state's sales, property, payroll or other factor when performing the state income tax computations. For example, cable subscriber revenue to be included in the state's sales numerator by a cable provider may be driven by the number of cable subscribers. In this case, cable subscriber revenue to be included in the state's sales numerator may be calculated as total cable subscriber revenue (across all states) times the number of cable subscribers in-state divided by the total number of cable subscribers.

Some other examples of special rules on how to compute the numerator amount are listed below. Airline ticket sales to be included in the state's sales numerator may be computed as total ticket sales times the number of flight take-offs in-state divided by the total number of flight take-offs. Aircraft property to be included in the state's property numerator may be calculated as total aircraft value times the number of flight take-offs in-state divided by the total number of flight take-offs. Railroad sales to be included in the state's sales numerator may be computed as total sales times the number of miles of tracks in-state divided by total miles of tracks.

The procedure of apportioning a given item of sales, property, payroll or other factor before including it in the state's factor numerator may be referred to as special apportionment. A driver used in the apportionment computation (e.g., the number of subscribers in the first example above) may be referred to as a special apportionment method. The dollar value of an item that must be apportioned across states may be captured in a special apportionment account. An account may be associated with a legal entity (e.g., a corporation), a sub-entity (e.g., a service or a product line within a corporation), a flow-through entity (e.g., a partnership), etc.

Many states allow taxpayers to select a special apportionment method for a given special apportionment account from a set of permitted special apportionment methods. For example, a state may allow apportioning ticket sales based on the number of flight takeoffs taking place in the state, as well as based on the number of miles flown above the state's territory, and leave a taxpayer the freedom to select which one of the two special apportionment methods to use. Changing a special apportionment method used for a given special apportionment account in a given state can have a sizable impact on the taxpayer's state income tax liability.

BRIEF DESCRIPTION OF DRAWINGS

Embodiments of the present invention are illustrated by way of example and not limitation in the figures of the accompanying drawings, in which like reference numbers indicate similar elements and in which:

FIG. 9 is a diagrammatic representation of an example user interface to present special apportionment computation results for viewing by a user, in accordance with an example embodiment;

FIGS. 11-14 are diagrammatic representations of example data collection screens to be presented by an example optimizer wizard, in accordance with an example embodiment;

FIGS. 15-17 are diagrammatic representations of an example user interface to present optimization results for viewing by a user, in accordance with an example embodiment.

DETAILED DESCRIPTION

Figure 1:
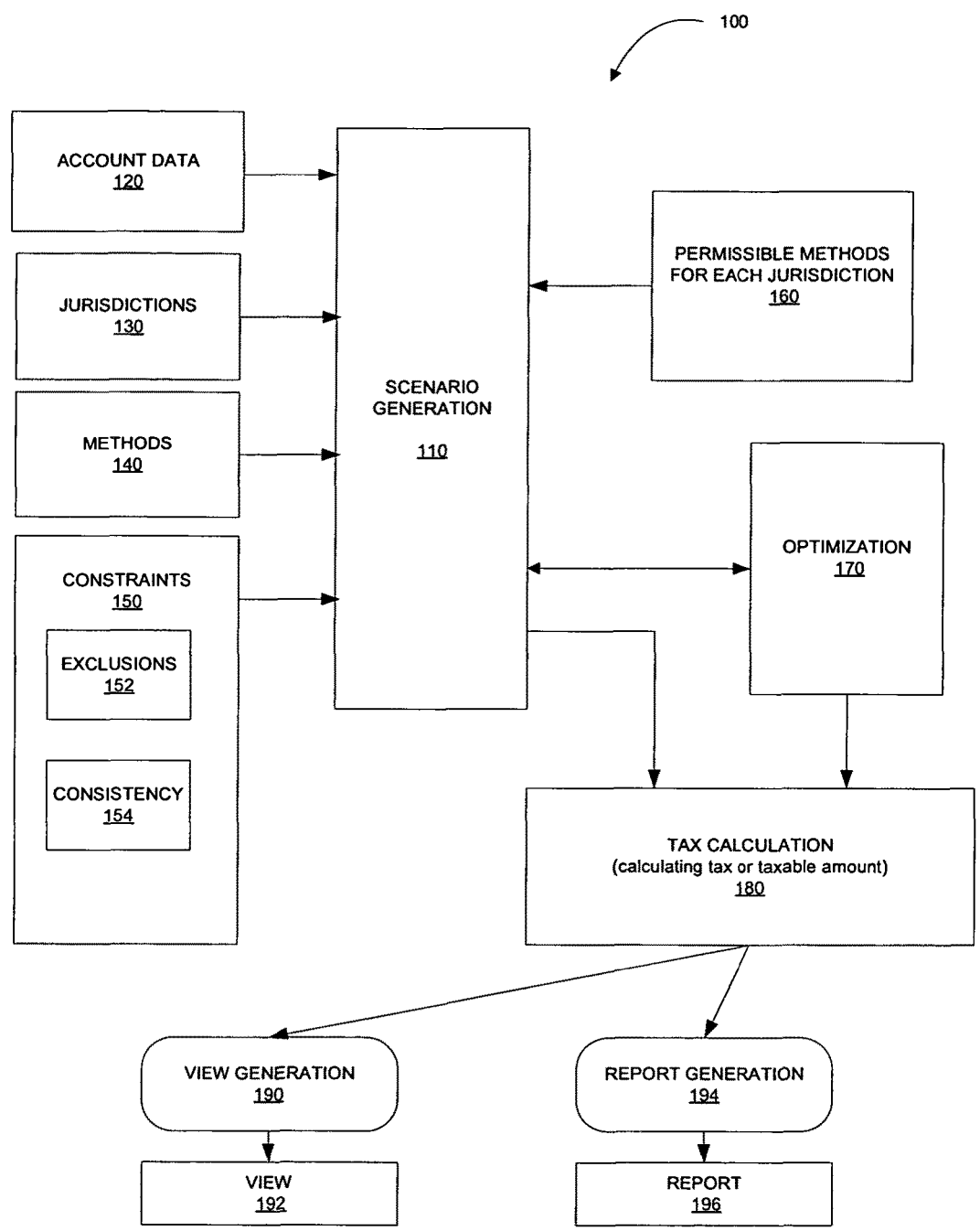
FIG. 1 is a diagrammatic representation of an architecture of a system to determine state income tax liability, in accordance with an example embodiment.

In one example embodiment, a system that includes special apportionment functionality (e.g., a special apportionment application) may provide users with an ability to analyze tax consequences of changing the special apportionment method for any number of special apportionment accounts. This information may be advantageously utilized by users in order to make informed decisions in selecting a particular special apportionment method for a particular account. An example system to provide special apportionment functionality may include a built-in optimizer to automatically determine the most favorable combination of special apportionment methods for a set of special apportionment accounts from a tax perspective.

An example system to provide special apportionment functionality may be utilized for a variety of purposes, including helping a user to answer a variety of questions, such as the example questions below.

How does a taxpayer's total state tax liability change if the number of cable subscribers doubles in a given state but remains unchanged in all other states?

How does a taxpayer's total state tax liability change if the number of cable subscribers in each state remains the same but gross receipts double?

Out of all different special apportionment methods that are allowed for a given special apportionment account in a given state, which special apportionment method yields the lowest tax or taxable dollar amount?

What is the best combination of special apportionment methods, from a tax perspective, taking all special apportionment accounts into consideration?

How is the taxpayer's total tax liability affected if legal entities with special apportionment accounts merge or split?

When a user wants to analyze the tax impact of changes to special apportionment methods, one example approach may include several steps. Example steps may include selecting data that may serve as the basis for the analysis by a special apportionment application, selecting a special apportionment method, performing tax calculations, and generating an output that is suitable for viewing.

The data describing tax-relevant attributes of an organization (e.g., one or several legal entities and/or filing groups) may be termed a scenario. An example scenario may include income amount, sales amount, property value, payroll amount, any special apportionment accounts and special apportionment methods, industry, tax credit generation information, prior year net operating losses (NOL) and credit balances, the entity structure (e.g., the way that the organization's business units are organized in legal entities), group membership, and any applicable tax rules. Included in the applicable tax rules may be one or more permitted special apportionment methods for each special apportionment account. A scenario may be created or modified, e.g., by loading data from Excel, by entering data through a User Interface (UI), or by duplicating an existing scenario already stored by the special apportionment application.

An example system having special apportionment functionality may include a special apportionment optimizer and an associated UI to identify tax savings that can be achieved by changing special apportionment methods and to provide a suggested special apportionment method for each relevant account in each relevant jurisdiction. An example architecture 100 of a special apportionment application is illustrated in FIG. 1.

As shown in FIG. 1, a scenario generation function 110 may receive information associated with one or several special apportionment accounts, e.g., account data 120, and other relevant information in order to generate a scenario to be used to determine tax liability taking any relevant special apportionment accounts into consideration. For example, in addition to the account data 120, the scenario generation function 110 may also receive information regarding relevant jurisdictions (jurisdictions 130), selections of special apportionment methods for each jurisdiction (special apportionment methods 140), as well as any constraints that a user desires to be taken into consideration (constraints 150). Example constraints may include exclusions 152, indicating whether a subject special apportionment account can (or should) be excluded from tax calculation in a particular jurisdiction, and consistency requirements 154, indicating whether the selection of a special apportionment method for a jurisdiction should be consistent across accounts or across years for which tax liability is being calculated.

Following the scenario generation 110, the generated scenario may be passed to a tax calculation function 180. In one example embodiment, the scenario may be run through optimization 170 to determine special apportionment methods to be utilized for tax calculation 180. The optimization 170 may utilize information regarding permitted special apportionment methods 160 that may be provided to the scenario generation 110. The results of the optimization 170 may also be used to modify the scenario through the scenario generation function 110.

After performing the tax calculation 180, results may be generated in a form viewable by a user, such as a report or a view. For example, a view generation function 190 may generate a view 192, and a report generation function 194 may generate a report 196. In one example embodiment, the architecture 100 may be utilized advantageously in the context of a network environment. An example of such a network is illustrated in FIG. 2.

Figure 2:
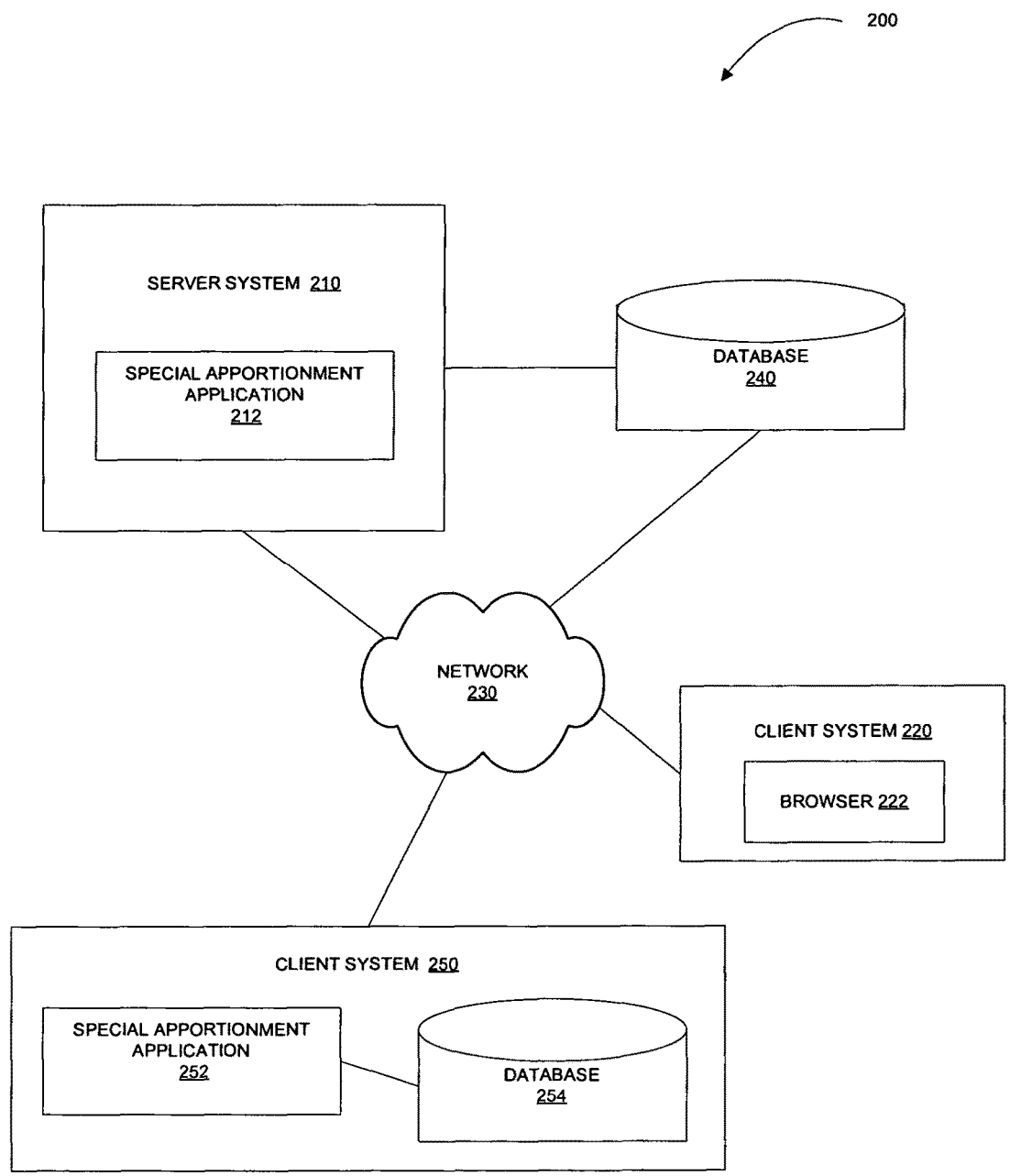
FIG. 2 is a diagrammatic representation of a network environment within which an example embodiment may be implemented.

FIG. 2 illustrates a network environment 200. The environment 200, in an example embodiment, includes a server system (server) 210 and a client system (client) 220, coupled to a communications network 230. The communications network 230 may be a public network (e.g., the Internet, a wireless network, etc.) or a private network (e.g., LAN, WAN, Intranet, etc.). The server 210 may host a special apportionment application 212. In one example embodiment, the client 220 may have access to the special apportionment application 212 via a browser application 222. The special apportionment application 212 may have access to a database 240.

In one example embodiment, a special apportionment application, such as a special apportionment application 252, may run on a client system 250. A client system may also be configured to host a local database 254. Thus, a special apportionment application may be utilized locally on a computer system, or remotely, via a communications network. An example special apportionment system that may correspond to the special apportionment application 212 or the special apportionment application 252 is discussed below with reference to FIG. 3.

Figure 3:
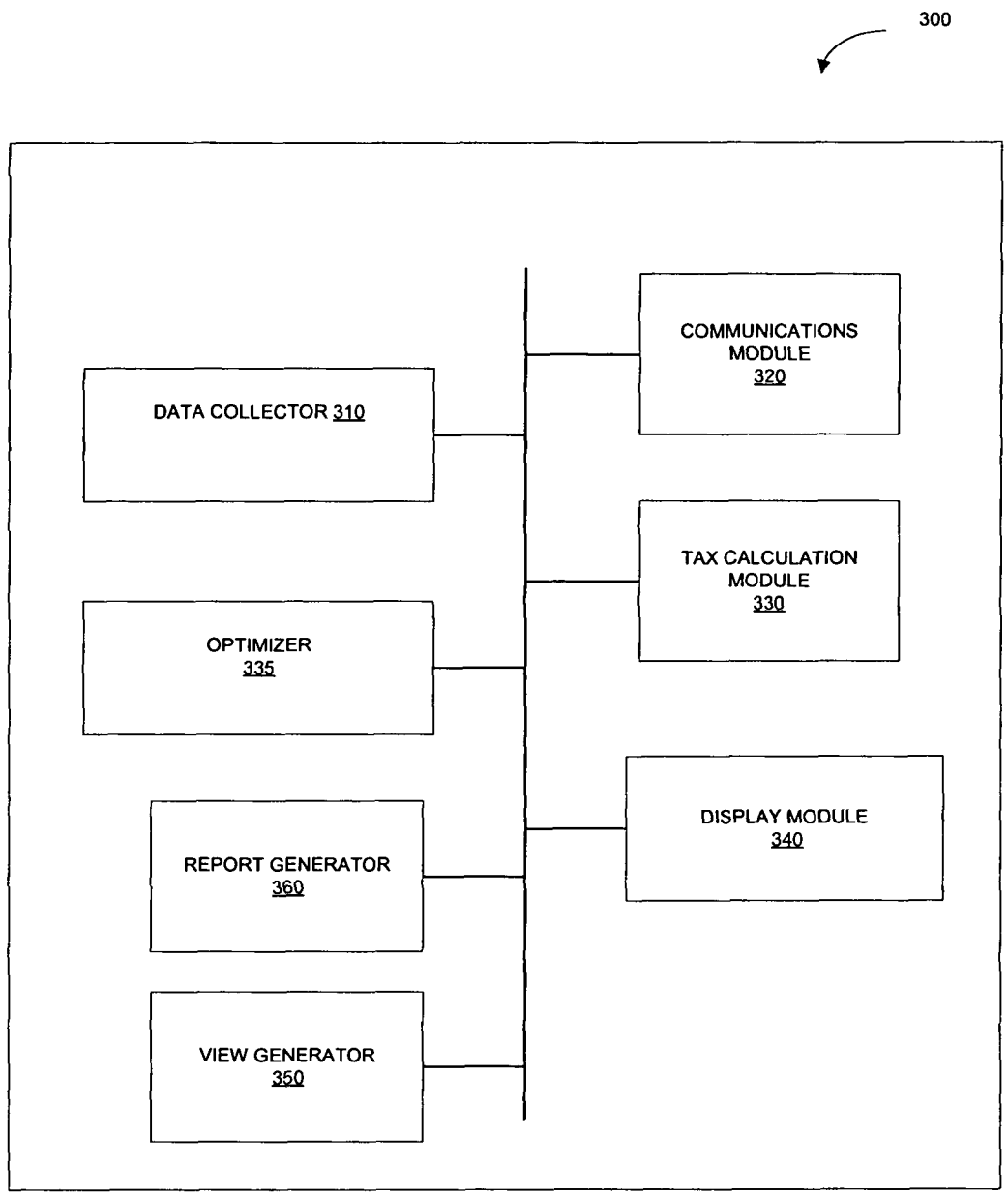
FIG. 3 is a block diagram of a system to determine state income tax liability, in accordance with an example embodiment.

FIG. 3 is a block diagram of a special apportionment system 300, in accordance with an example embodiment. As shown in FIG. 3, the system 300 includes a data collector 310, a communications module 320, a tax calculation module 330, an optimizer 335, a display module 340, a view generator 350, and a report generator 360. The data collector 310 may be configured to collect information that may be utilized to calculate tax consequences for one or more legal entities or filing groups, or an entire organization. For example, the data collector 310 may obtain information associated with one or more accounts, selection of relevant jurisdictions and associated permitted special apportionment methods, any constraints that may be taken into consideration while determining tax liability for the legal entities or filing groups of the organization, and so on. The data collector 310 may cooperate with the communications module 320. The communications module may be configured to receive messages, e.g., via an input device of an associated computer system.

In one example embodiment, the data collector 310 may be configured to organize the collected information to generate a scenario for determining relevant tax consequences. The scenario may be utilized by the tax calculation module 330 to calculate tax amount or, in some embodiments, a taxable amount associated with a particular account or with a plurality of accounts.

The tax calculation module 330 may cooperate with the optimizer 335 of the system 300. The optimizer 335 may be configured to receive relevant information from the data collector 310 and to determine, for each relevant account, in each relevant jurisdiction, a special apportionment method that may yield the lowest tax liability for one or more legal entities or filing groups, or the entire organization, as compared to utilizing other special apportionment methods. The tax calculation module 330 and the optimizer 335 may be configured to make the results that they generate available to the view generator 350 and to the report generator 360. The view generator 350 and the report generator 360 may be configured to generate tax-related views and tax-related reports respectively. The display module 340 may be configured to make the results generated by the view generator 350 and the report generator 360 visually available to users.

It will be noted that, in some example embodiments, the functions performed by two separate modules of the system 300 may be performed by a single module. For example, the generation of views and reports may be performed by the report generator 360. In another example embodiment, the operations of collecting data and generating a scenario that are performed by the single data collector 310 of FIG. 3 may be performed by separate modules (not shown).

As mentioned above, the special apportionment application 212 or 252, which, in an example embodiment, may be implemented as the system 300, may be utilized to determine tax consequences of using a particular special apportionment method or set of such methods for one or more special apportionment accounts. The one or more special apportionment accounts may be associated with one industry or with a plurality of industries. An example method to determine the tax consequences of using a particular special apportionment method or set of such methods for one or more special apportionment accounts may be described with reference to FIG. 4.

Figure 4:
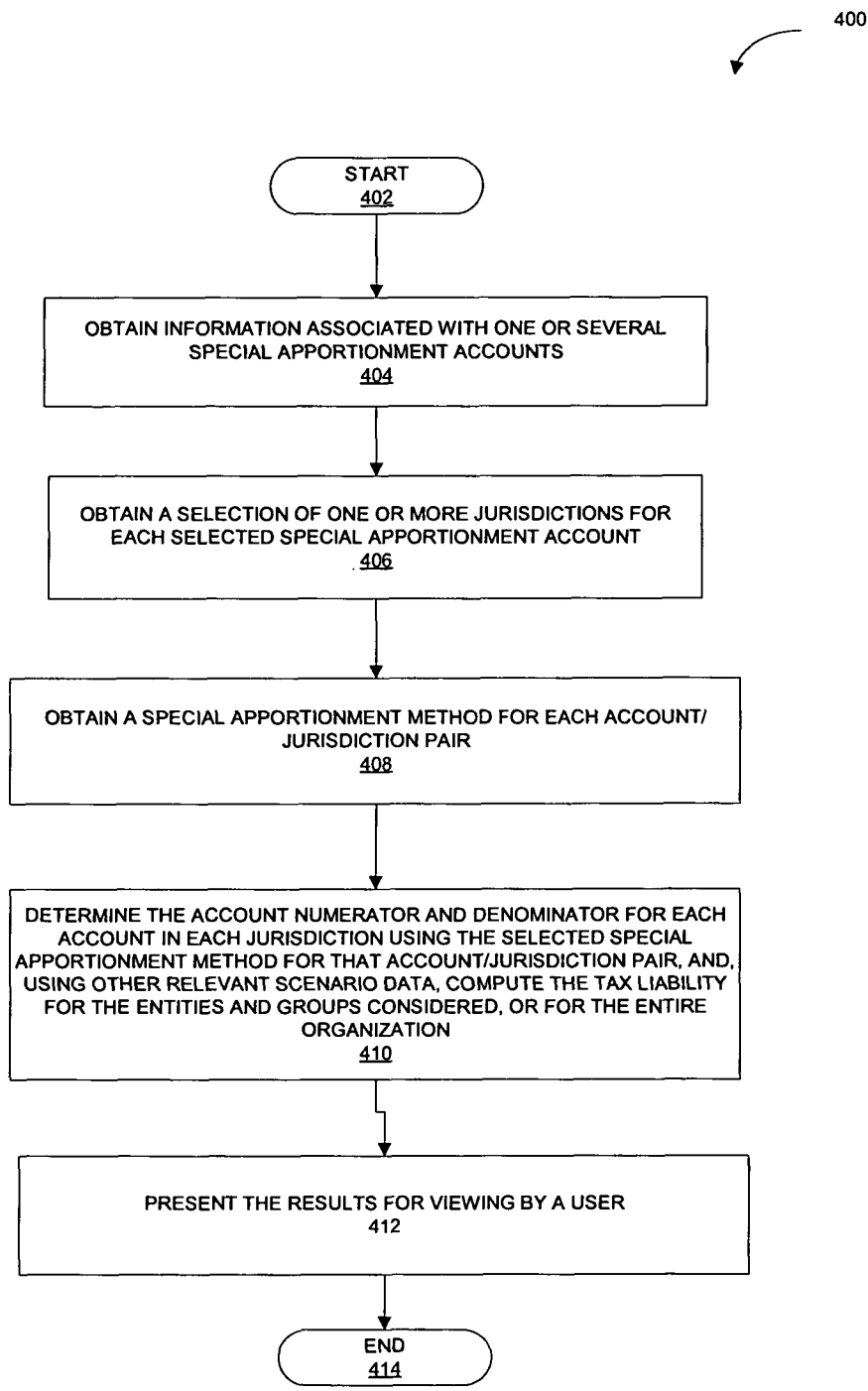
FIG. 4 is a flow chart of a method to determine state income tax liability, in accordance with an example embodiment.

FIG. 4 is a flow chart of a method 400 to determine state income tax liability, according to an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at a server system 210 of FIG. 2. In another example embodiment, the processing logic may reside at the client 250 or may be distributed between the client 220 and the server 210 of FIG. 2. In one example embodiment, the method 400 may be performed by the various modules discussed above with reference to FIG. 3. Each of these modules may comprise processing logic.

As shown in FIG. 4, the method 400 commences at operation 402. The data collector 310 obtains information associated with one or more special apportionment accounts (accounts) at operation 404, a selection of one or more jurisdictions for each account at operation 406, and a special apportionment method for each jurisdiction/account pair, at operation 408. In one example embodiment, the data collector 310 may obtain information from a user via one or more HTML web pages, as shown in FIGS. 5-8.

Figure 5:
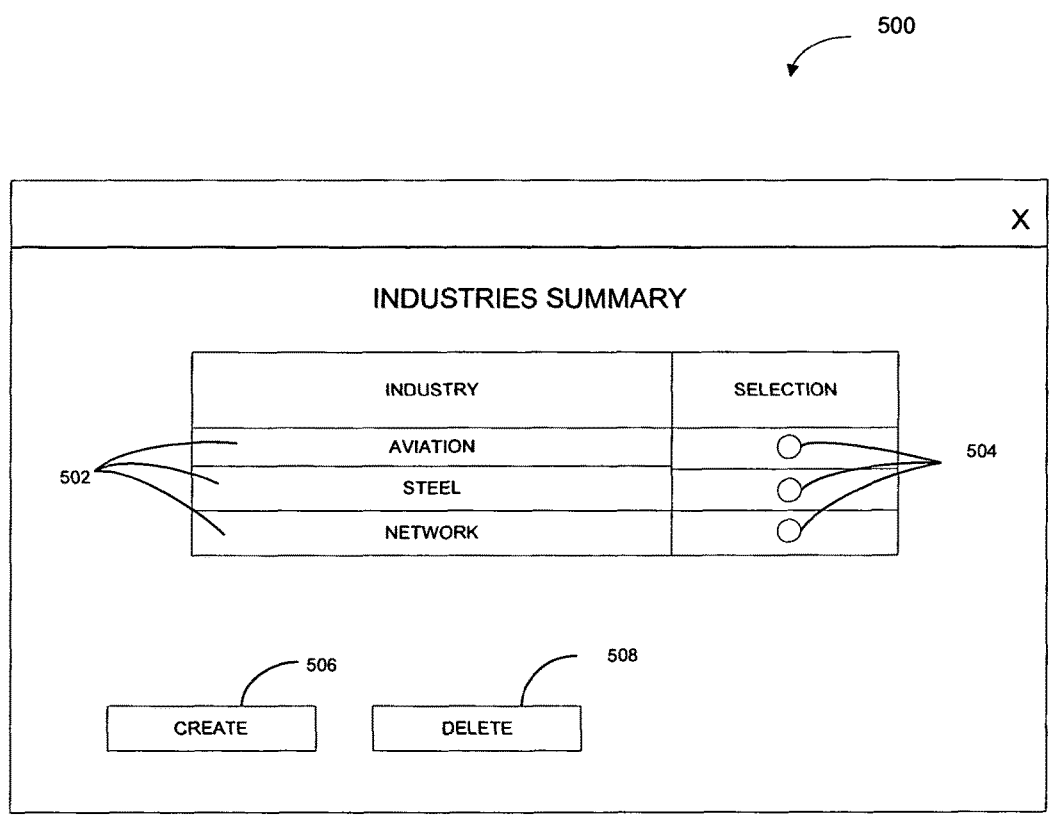
FIG. 5 is a diagrammatic representation of an example user interface to permit a user to create or delete one or more industries, in accordance with an example embodiment.

FIG. 5 shows a UI 500 associated with the special apportionment system 300 to permit a user to create or delete one or more industries. As illustrated in FIG. 5, the special apportionment system 300, in one example embodiment, may allow a user to define several industries. An industry may be utilized, in the context of determining the tax consequences of special apportionment, as an object that may be used to drive special apportionment in the system 300. Industry selection may serve as a potential filtering mechanism for wizards, data entry views, and analysis views.

As shown in FIG. 5, the UI 500 may include industry fields 502, which identify industries that may be selected, and associated selection controls 504 in an example embodiment of radio buttons. The UI 500 may also include various control buttons, such as a "CREATE" button 506 and a "DELETE" button 508. The "CREATE" button 506 may be utilized by a user to create a representation of one or more additional industries. The "DELETE" button 508 may be utilized by a user to delete a representation of one or more industries. Within each industry, the example special apportionment system 300 may track several special apportionment methods, as illustrated in FIG. 6.

Figure 6:
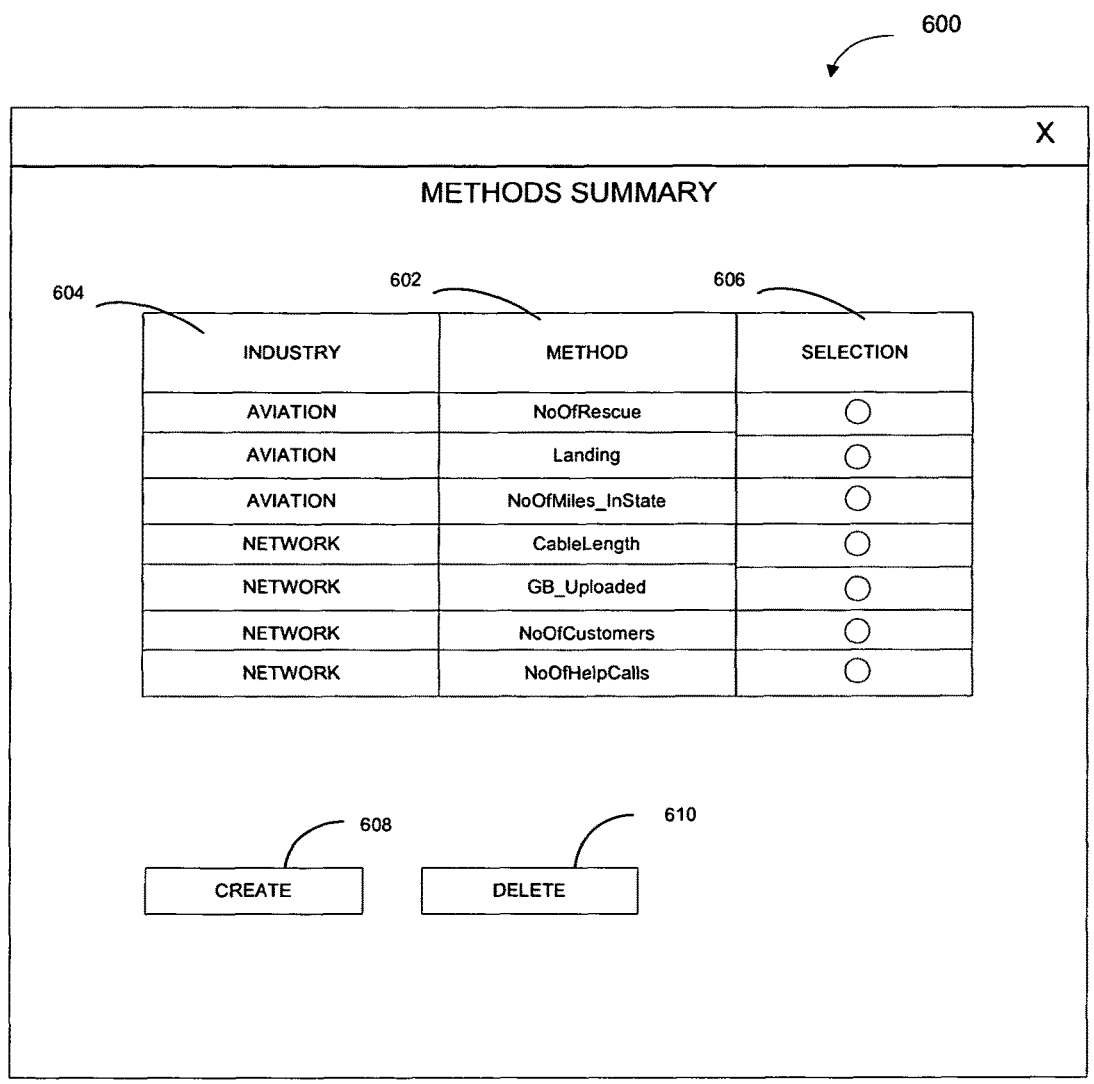
FIG. 6 is a diagrammatic representation of an example user interface to permit a user to create or delete one or more special apportionment methods, in accordance with an example embodiment.

FIG. 6 shows a UI 600 associated with the special apportionment system 300 to permit a user to create or delete one or more special apportionment methods. As mentioned above, a special apportionment method may represent the driver used to apportion the amounts captured in special apportionment accounts across jurisdictions (e.g., across states). In FIG. 6, available special apportionment methods for each industry are presented in column 602. Column 604 includes associated industry names. Selection controls 606 allow a user to select special apportionment methods.

A representation of a special apportionment method for an entity may include a special apportionment method identifier (e.g., a special apportionment method name), a numerator amount for each jurisdiction, and a denominator amount that is common to all jurisdictions. For example, one of the special apportionment methods associated with the "Network" industry may include a special apportionment method identified as "Cable subscribers" that utilizes the number of cable subscribers as a driver. For a given entity, the "Cable subscribers" special apportionment method may have numerator amounts of, e.g., 50 subscribers in Arkansas and 100 subscribers in California. A denominator amount for the "Cable subscribers" special apportionment method, which is common to all jurisdictions, may be 2,000 subscribers in total. A combination of the numerator amounts and denominator amount may be associated with each entity, sub-entity or flow-through entity in the subject industry.

The UI 600 may further include various control buttons, such as a "CREATE" button 608 and a "DELETE" button 610. The "CREATE" button 608 may be utilized by a user to create a representation of one or more additional special apportionment methods. The "DELETE" button 610 may be utilized by a user to delete a representation of one or more special apportionment methods.

Figure 7:
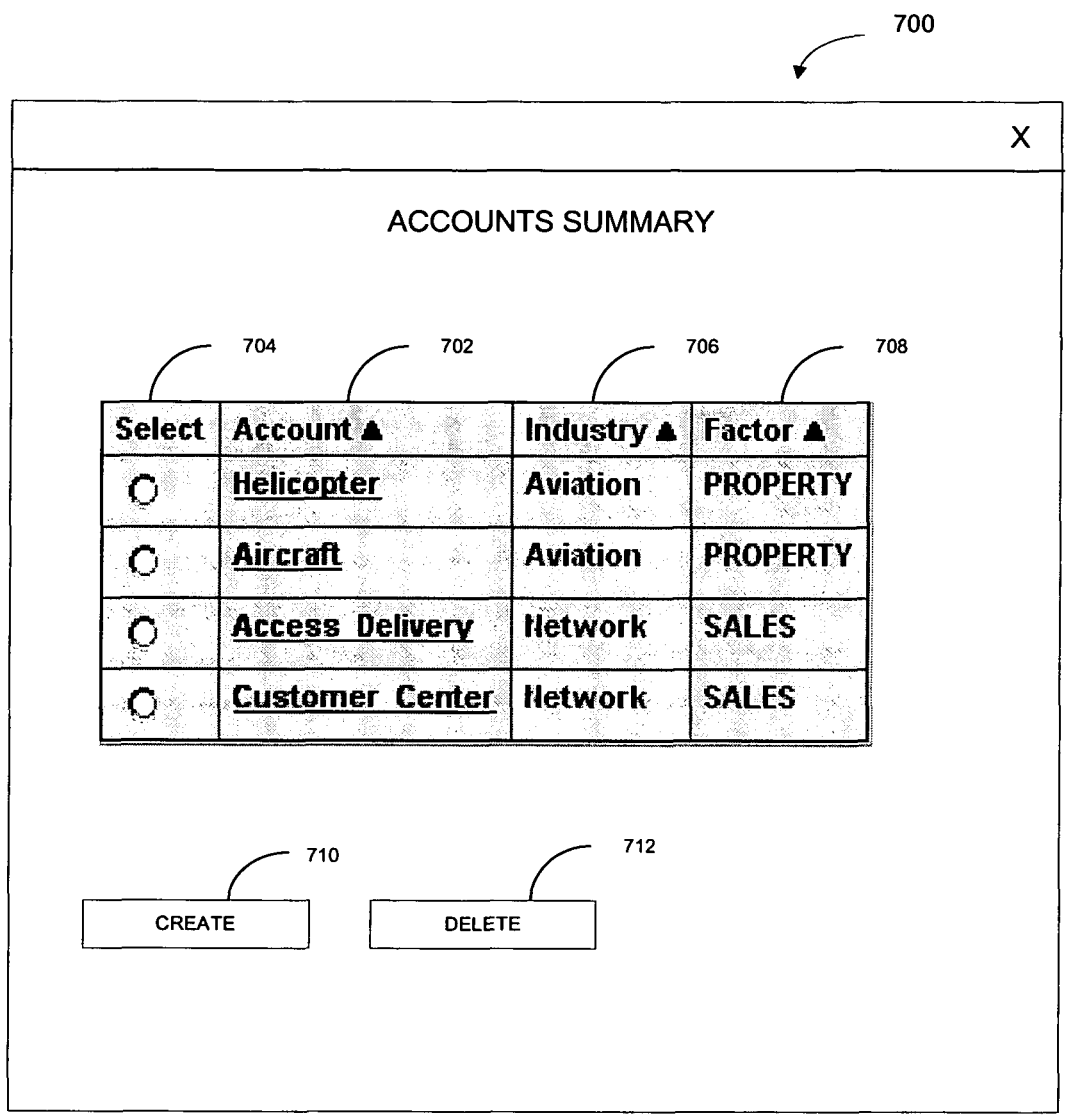
FIG. 7 is a diagrammatic representation of an example user interface to permit a user to create or delete one or more special apportionment accounts, in accordance with an example embodiment.

FIG. 7 shows a UI 700 associated with the special apportionment system 300 to permit a user to create or delete one or more accounts. As shown in FIG. 7, the UI 700 may include account fields 702 that identify accounts and that may be selected by a user utilizing associated selection controls 704. Fields 706 provide identification of associated industries, and fields 708 display associated factors for each account. Thus, the UI 700 shows a screen summarizing the name, industry, and factor for each special apportionment account.

The UI 700 may also include various control buttons, such as a "CREATE" button 710 and a "DELETE" button 712. The "CREATE" button 710 may be utilized by a user to create a representation of one or more additional accounts.

The "DELETE" button 712 may be utilized by a user to delete a representation of one or more accounts.

Figure 8:
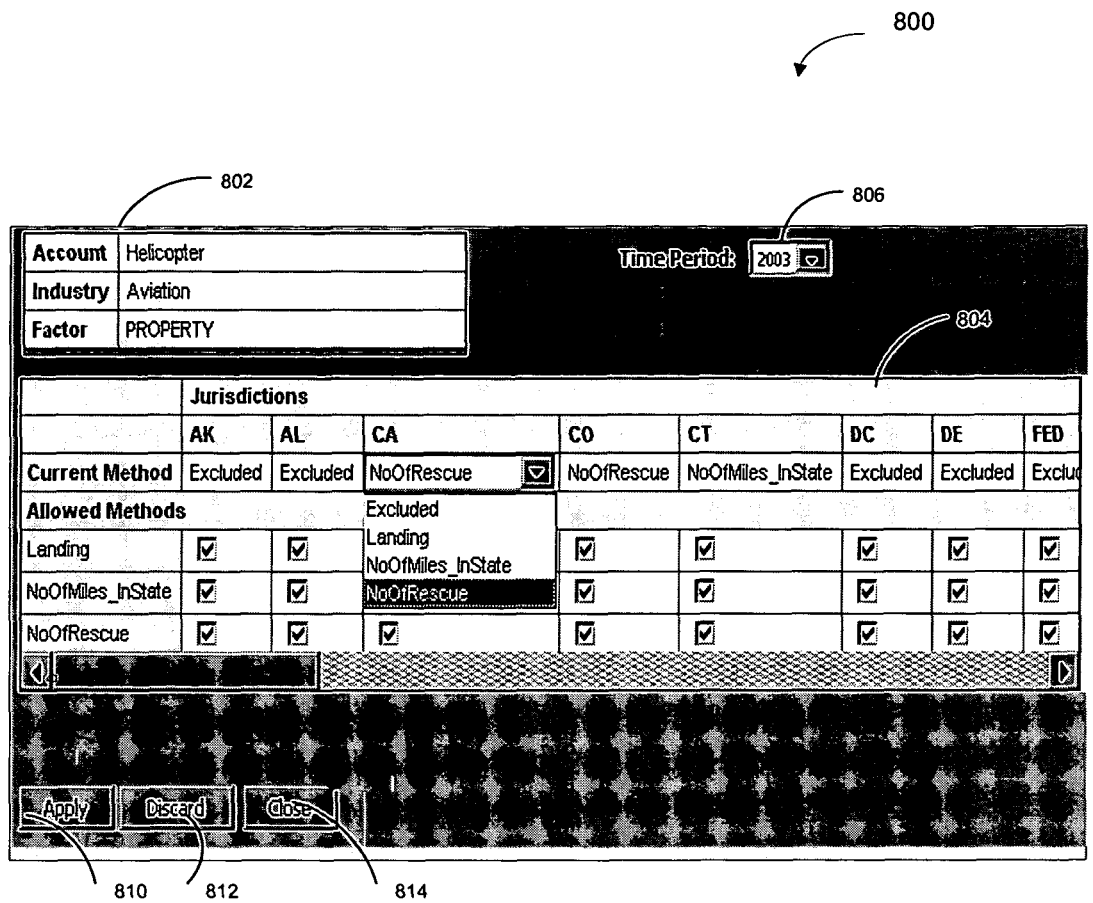
FIG. 8 is a diagrammatic representation of an example user interface to permit a user to select a set of special apportionment methods for a special apportionment account and to define the permissible methods for each jurisdiction, in accordance with an example embodiment.

FIG. 8 is a diagrammatic representation of an example UI 800 to permit a user to capture a set of special apportionment methods for a special apportionment account (an account), in accordance with an example embodiment. The example UI 800 may include account information area 802 to present the identification, the industry, and the factor associated with the account considered. A special apportionment methods selection area 804 may be presented to permit a user to modify a selection of a special apportionment method for any presented jurisdiction, e.g., by activating an "APPLY" control button 810. In response to the activating of the "APPLY" control button 810, the special apportionment system 300 may be instructed to recalculate tax liability for one or more entities or filing groups, or the entire organization.

The UI 800 may further include a time period field 806 to permit a user to select a target year for which the special apportionment methods are specified, a "DISCARD" control button 812 to permit a user to request that any data entered via the UI 800 be discarded, and a "CLOSE" control button 814 to permit a user to request that a window associated with the UI 800 be closed.

Returning to FIG. 4, after the data collector 310 obtains relevant data, the method 400 continues to operation 410. At operation 410, the tax calculation module 330 may automatically determine the factor numerator and denominator for each account in each jurisdiction, entity and filing group, and recalculate the tax liability for the relevant entities or groups, or for the entire organization. At operation 412, the display module 340 may present the results generated by the tax calculation module 330 for viewing by a user. The results may be presented, in one example embodiment, as shown in FIG. 9.

FIG. 9 is a diagrammatic representation of an example user interface (UI) 900 to present tax results for viewing by a user, in accordance with an example embodiment. As shown in FIG. 9, the UI 900 may include an industry area 902, an account name and factor area 904, a time period area 906, and a total amount area 908. A special apportionment calculation results area 910 may be used to present a user with the factor numerators calculated based on the information presented in the fields associated with the areas 902-908 and the "Units (#)" captured for each jurisdiction in area 910.

When performing special apportionment computations, the example special apportionment system 300 may compute the amount included in the numerator of the sales, property, payroll or user-defined factor of a given state as the amount of the special apportionment account to be apportioned, times the numerator of the current special apportionment method in the state, divided by the denominator of the current special apportionment method. In the example shown in FIG. 9, the amount subject to special apportionment for an account labeled "Access_Delivery" is captured in the area 908 labeled "Everywhere Dollar Amount to Spread." This amount is spread across states using a special apportionment method that can be different in each state. For each state, the special apportionment system 300 may display the apportioned values for all permitted special apportionment methods.

The special apportionment system 300 may be configured to highlight the amounts obtained using the current special apportionment method, e.g., by utilizing a bold border line for an associated cell. The amounts obtained using the current special apportionment method may be then included in the entity's factor numerator in that state. The amounts obtained using alternative special apportionment methods may also be presented in the special apportionment calculation results area 910 to aid users in analyzing the consequences of selecting different special apportionment methods.

For jurisdictions where an entity belongs to a Unitary Business Group (UBG), the special apportionment system 300 may allow the special apportionment calculation to be performed as a combined special apportionment calculation or as a separate special apportionment calculation. In a case of a combined special apportionment calculation, the special apportionment computations may be performed in two steps. First, the special apportionment method numerator and denominator values of all member entities may be added up and a special apportionment ratio for the group may be computed. This ratio may then be used in the special apportionment computations of all member entities, e.g., each entity may apportion its own special apportionment account value using the group ratio. The group ratio may be displayed in the "Group Ratio (%)" row in the UI 900 shown in FIG. 9, and the "Legal Entity Ratio (%)" cell for that state would be grayed out.

In a case of a separate special apportionment calculation, the special apportionment computation for each entity may be performed based on the special apportionment method numerator and denominator values for the entity considered. The ratio may be presented in the "Legal Entity Ratio (%)" row in the special apportionment computation results area 910 of the UI 900 shown in FIG. 9.

Where an entity is a flow-through entity (FTE), the special apportionment system 300 may be configured as described below. If the FTE is treated as a corporation or as a partnership using the allocation method, all special apportionment computations may be performed at the FTE level. The results of the special apportionment computations may be included in the FTE's factors. If the FTE is treated as a corporation and is a member of a UBG in the state, it may use the group ratio if the combined method mentioned above is selected. If the FTE is treated as no tax, no special apportionment computations are performed.

If the FTE is treated as a partnership or disregarded entity using the apportionment method, a user may select either of the following two options. The first option may include performing the special apportionment computations at the FTE level and flowing the resulting factor numerator and denominator to the owner at ownership percentage. Another option may include flowing the FTE's special apportionment method numerator and denominator values to the owner at ownership percentage, computing the special apportionment method ratio at the owner level based on the sum of its standalone and its share of the FTE's special apportionment method numerator and denominator values, and using the owner's ratio to apportion its share of the FTE's special apportionment account value.

As mentioned above, the special apportionment system 300 of FIG. 3 may be configured to utilize an optimizer to determine a combination of special apportionment methods for a selected set of special apportionment accounts, such that utilizing the determined combination of special apportionment methods would yield the lowest dollar amount in tax liability for one or more entities, filing groups, or the entire organization. High level operations that may be performed by the special apportionment system 300 utilizing an optimizer may be described with reference to FIG. 10.

Figure 10:
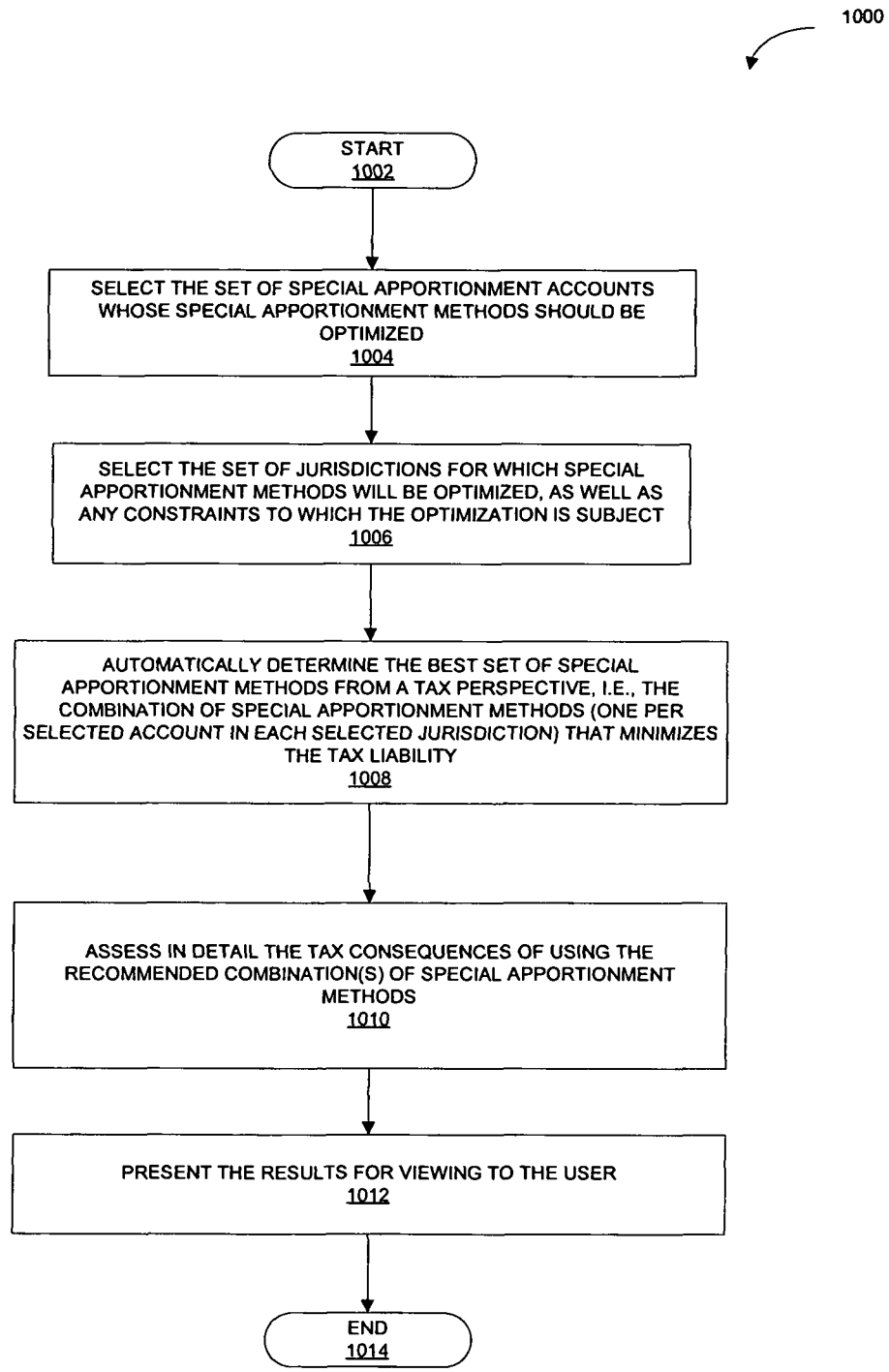
FIG. 10 is a flow chart of a method to generate a suggested combination of special apportionment methods, in accordance with an example embodiment.

FIG. 10 is a flow chart of a method 1000 to generate a recommended combination of special apportionment methods for a selected set of special apportionment accounts in a selected set of jurisdictions for one or more years, according to an example embodiment. The method 1000 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at a server system 210 of FIG. 2. In another example embodiment, the processing logic may reside at the client 250 or may be distributed between the client 220 and the server 210 of FIG. 2. In one example embodiment, the method 1000 may be performed by the various modules discussed above with reference to FIG. 3. Each of these modules may comprise processing logic.

As shown in FIG. 10, the method 1000 commences at operation 1002. The data collector 310 of FIG. 3 may obtain information associated with one or more special apportionment accounts at operation 1004 and one or more jurisdictions at operation 1006. The optimizer 335 may then automatically determine a suggested combination of special apportionment methods, one for each selected account in each selected jurisdiction in each year considered, at operation 1008. In one example embodiment, the data collector 310 may obtain input information from a user via one or more HTML web pages and utilize the input information to determine information associated with a special apportionment account and the jurisdictions for the special apportionment account.

In one example embodiment, the input information from a user may be collected via an interactive UI, a so-called optimizer wizard, that may be configured to lead a user through dialog steps. An optimizer wizard may permit a user to specify the desired options and constraints for a special apportionment optimization run. Some example user options and constraints that may be captured in the optimizer wizard may include instructions on whether to take into consideration net operating losses (NOLs) and credits, a selection of one or more industries for which special apportionment optimization should be performed, and a selection of one or more jurisdictions in which special apportionment optimization should be performed. FIGS. 11-14 are screenshots of an example special apportionment optimizer wizard, illustrating how the above options and constraints may be captured.

Figure 11:
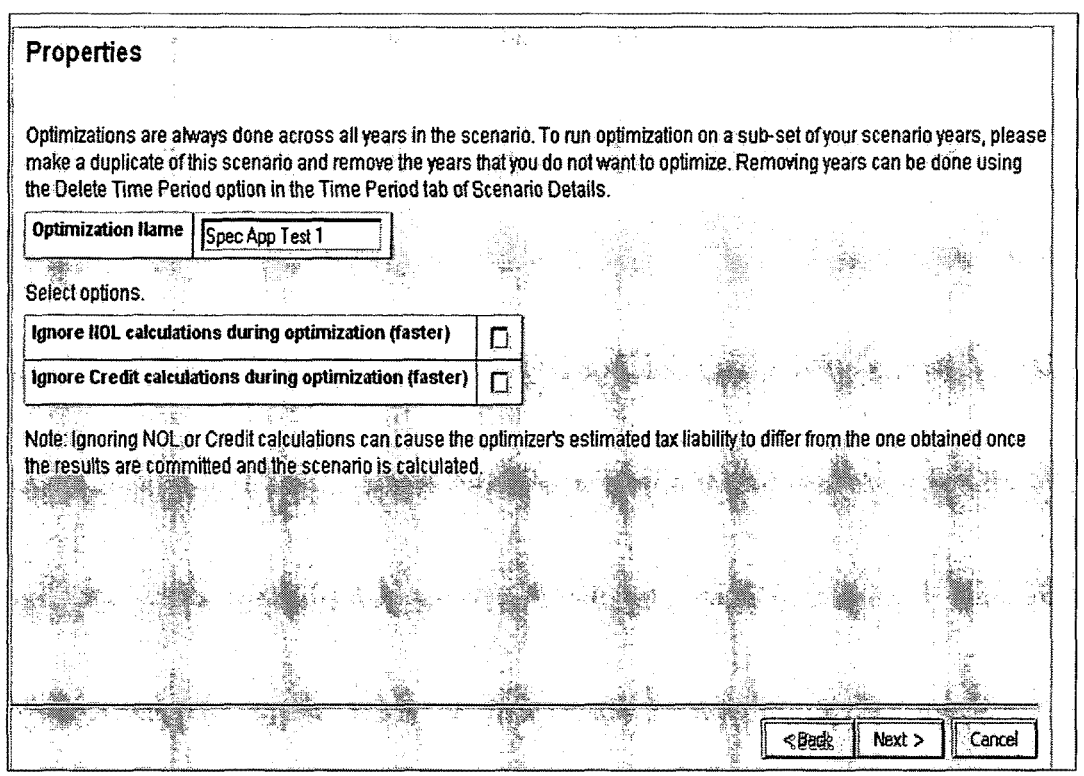
Figure 12:
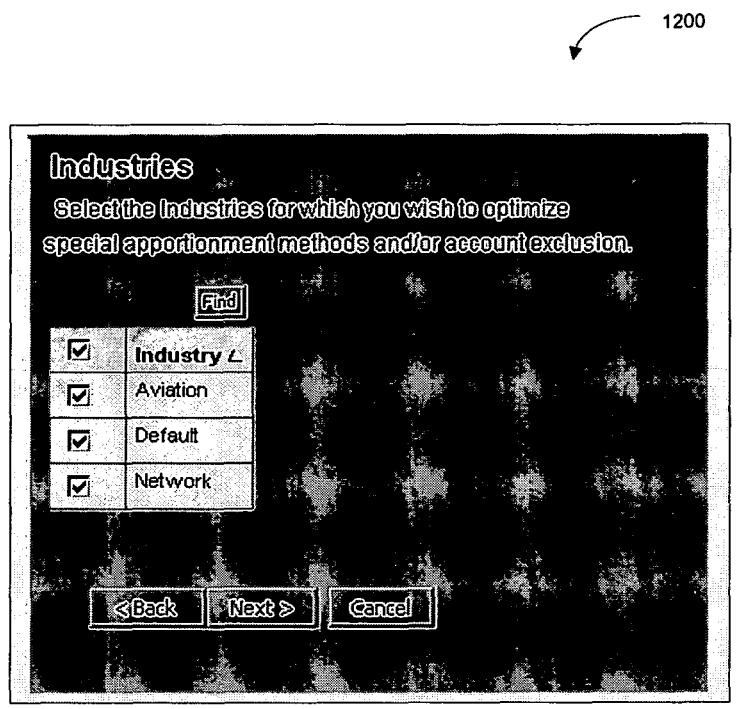
Figure 14:
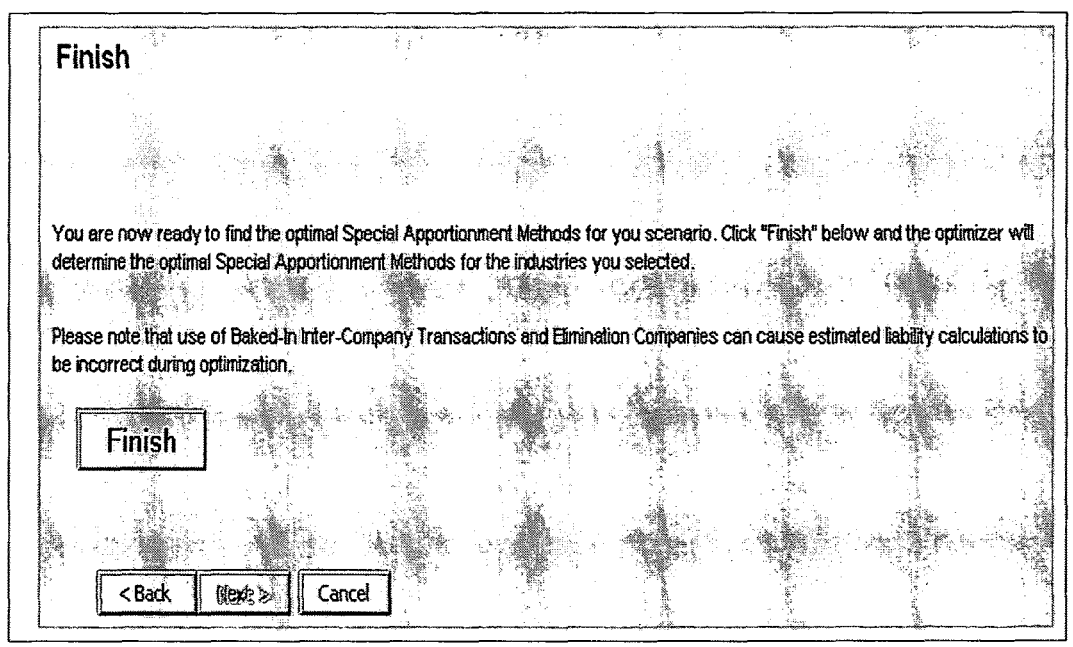

FIG. 11 illustrates a screen 1100 to collect inputs for an optimizer run, such as, for example, an option to ignore NOL or credit calculations during optimization. FIG. 12 illustrates a screen 1200 to select the industries for which optimization will be performed; the selection of the industries may automatically imply the set of accounts whose special apportionment methods should be optimized. FIG. 13 illustrates a screen 1300 to select jurisdictions for which optimization will be performed, as well as constraints restricting how special apportionment methods may be selected. FIG. 14 illustrates a screen 1400 to permit a user to begin the automated optimization process utilizing the information provided by the user via the screens 1200, 1300, and 1400, as well as any other relevant data already captured in the scenario.

In addition to being permitted to select options and constraints for special apportionment methods via the example optimizer wizard, a user may be permitted to constrain the set of permissible special apportionment methods for each account through the "Account Details" page illustrated in FIG. 8 and described above.

For each of the selected jurisdictions, the optimizer wizard may also collect information on whether the optimizer is allowed to exclude special apportionment accounts in any of the selected jurisdictions. If an account is excluded for a particular jurisdiction, the tax liability may be computed as if the account does not exist in the particular jurisdiction. The optimizer wizard may also collect information on whether the determined special apportionment methods should be consistent across all special apportionment accounts within an industry in a given jurisdiction, and whether the determined special apportionment methods should be consistent across all years captured in the scenario.

Returning to FIG. 10, the optimizer 335 of FIG. 3 may determine a suggested combination of special apportionment methods, one for each selected account in each selected jurisdiction, at operation 1008. The tax calculation module 330 may determine in detail, at operation 1010, the tax consequences of using the recommended combination of special apportionment methods, i.e., measure the tax impact of the recommended changes in special apportionment methods for each selected account in each selected jurisdiction, for one or more entities or filing groups or for the entire organization. The display module 340 may present the results generated by the optimizer 335 and the tax calculation module 330 to a user for viewing at operation 1012. The method 1000 ends at operation 1014.

In one example embodiment, the optimizer 335 may be configured to compare the total tax liability achieved for a given set of special apportionment methods (an example set may include one current special apportionment method per special apportionment account and jurisdiction) with the total tax liability for a number of alternate sets of special apportionment methods. It will be noted that, for the purposes of this description, the term "tax" will be understood to mean the total tax liability to be minimized. If the tax achieved using one of the alternate sets is lower than the tax achieved with the current set, the optimizer 335 may select the alternate set. The optimizer 335 then starts a new comparison. These operations may be repeated until the set corresponding to the lowest tax is determined.

More specifically, in one embodiment, the optimizer 335 may be configured to perform the following operations:
1. Compute the tax liability using the current special apportionment methods of all sales, property, payroll and user-defined accounts in all industries and all states as captured in the scenario when the optimizer run is started.
2. Set the current tax to be equal to the initial tax.
3. Go through all states in which special apportionment optimization is allowed. Determine the set of special apportionment methods that yield the lowest tax liability under the consistency constraints provided by the user by running one of the following four cases.

Case 1: Consistency Across Years and Across Accounts.

If the user has specified that the special apportionment methods should be consistent both across years and across all accounts in a given industry, then the best special apportionment method for each industry is determined as follows:
  a. For each industry, determine the set of special apportionment methods that are allowed for all accounts and across all years in that industry. This is the set from which the best special apportionment method in each industry can be selected. ("Exclude" is treated as another special apportionment method.)

b. Set the minimum tax liability that has been encountered so far to be equal to the current tax liability.
c. For each sales, property, payroll and user-defined account, let the tentative special apportionment method be equal to the current special apportionment method.
d. Go through all industries that have been selected for special apportionment optimization. For each industry, go through all special apportionment methods that are allowed according to the list generated in step (a). Call this special apportionment method the candidate special apportionment method.
  (i) For each year, set the tentative special apportionment method of all sales, property, payroll and user-defined accounts in the industry considered to be equal to the candidate special apportionment method.
  (ii) Compute the tax liability using the tentative special apportionment methods.
  (iii) For each year, set the tentative special apportionment method of all sales, property, payroll and user-defined accounts in the industry considered to be equal to the current special apportionment method (i.e., undo the change in (i)).
  (iv) If the tax liability from (ii) is lower than the minimum tax liability encountered so far,
    i. Record the identity of the industry and the candidate special apportionment method (call them the preferred industry and the preferred special apportionment method), and
    ii. Set the minimum tax liability encountered so far to be equal to the tax liability from (ii).
e. If the minimum liability encountered is lower than the current liability,
  (i) For each year, set the current special apportionment method of all sales, property, payroll and user-defined accounts in the preferred industry to be equal to the preferred special apportionment method.
  (ii) Set the current tax liability to be equal to the minimum tax liability encountered.
  (iii) Go back to step (d).
f. Else, exit and return the current special apportionment methods to the user (they describe the optimal solution).

Case 2: Consistency Across Years but not Across Accounts.

If the user has specified that the special apportionment methods should be consistent across years but not across accounts, then the best special apportionment method for each account is determined as follows:
a. For each account, determine the set of special apportionment methods that are allowed across all years. This is the set from which the best special apportionment method for each account can be selected. ("Exclude" is treated as another special apportionment method.)
b. Set the minimum tax liability that has been encountered so far to be equal to the current tax liability.
c. For each sales, property, payroll and user-defined account, let the tentative special apportionment method be equal to the current special apportionment method.
d. Go through all accounts. For each account, determine whether it is in an industry for which special apportionment optimization has been selected. If so, go through all special apportionment methods that are allowed for this account according to the list generated in step (a). Call this special apportionment method the candidate special apportionment method.
  (i) For each year, set the tentative special apportionment method for the account considered to be equal to the candidate special apportionment method.
  (ii) Compute the tax liability using the tentative special apportionment methods.
  (iii) For each year, set the tentative special apportionment method for the account considered to be equal to the current special apportionment method (i.e., undo the change in (i)).
  (iv) If the tax liability from (ii) is lower than the minimum tax liability encountered so far,
    i. Record the identity of the account and the candidate special apportionment method (call them the preferred account and the preferred special apportionment method), and
    ii. Set the minimum tax liability encountered so far to be equal to the tax liability from (ii).
e. If the minimum liability encountered is lower than the current liability,
  (i) For each year, set the current special apportionment method of the preferred account to be equal to the preferred special apportionment method.
  (ii) Set the current tax liability to be equal to the minimum tax liability encountered.
  (iii) Go back to step (d).
f. Else, exit and return the current special apportionment methods to the user (they describe the optimal solution).

Case 3: Consistency Across Accounts but not Across Years.

If the user has specified that the special apportionment methods should be consistent across all accounts in a given industry but not across years, then the best special apportionment method for each industry and year is determined as follows:
a. For each industry and year, determine the set of special apportionment methods that are allowed for all accounts in that industry in that year. This is the set from which the best special apportionment method in each industry and year can be selected. ("Exclude" is treated as another special apportionment method.)
b. Set the minimum tax liability that has been encountered so far to be equal to the current tax liability.
c. For each sales, property, payroll and user-defined account, let the tentative special apportionment method be equal to the current special apportionment method.
d. Go through all years and all industries that have been selected for special apportionment optimization. For each such industry/year pair, go through all special apportionment methods that are allowed according to the list generated in step (a). Call this special apportionment method the candidate special apportionment method.
  (i) Set the tentative special apportionment method of all sales, property, payroll and user-defined accounts in the industry and year considered to be equal to the candidate special apportionment method.
  (ii) Compute the tax liability using the tentative special apportionment methods.
  (iii) Set the tentative special apportionment method of all sales, property, payroll and user-defined accounts in the industry and year considered to be equal to the current special apportionment method (i.e., undo the change in (i)).
  (iv) If the tax liability from (ii) is lower than the minimum tax liability encountered so far, i. Record the year, the identity of the industry and the candidate special apportionment method (call them the preferred year, the preferred industry and the preferred special apportionment method), and ii. Set the minimum tax liability encountered so far to be equal to the tax liability from (ii).

e. If the minimum liability encountered is lower than the current liability, (i) Set the current special apportionment method of all sales, property, payroll and user-defined accounts in the preferred industry and year to be equal to the preferred special apportionment method.

(ii) Set the current tax liability to be equal to the minimum tax liability encountered.

(iii) Go back to step (d).

f. Else, exit and return the current special apportionment methods to the user (they describe the optimal solution).

Case 4: Consistency Neither Across Years Nor Across Accounts

If the user has specified that the special apportionment methods need not be consistent across years or across accounts, the best special apportionment method for each account/year combination is determined as follows:

a. Set the minimum tax liability that has been encountered so far to be equal to the current tax liability.

b. For each sales, property, payroll and user-defined account, let the tentative special apportionment method be equal to the current special apportionment method.

c. Go through all years and accounts. For each account, determine whether it is in an industry for which special apportionment optimization has been selected. If so, go through all special apportionment methods that are allowed for this account in that year. Call this special apportionment method the candidate special apportionment method.

(i) Set the tentative special apportionment method for the account and year considered to be equal to the candidate special apportionment method.

(ii) Compute the tax liability using the tentative special apportionment methods.

(iii) Set the tentative special apportionment method for the account and year considered to be equal to the current special apportionment method (i.e., undo the change in (i)).

(iv) If the tax liability from (ii) is lower than the minimum tax liability encountered so far, i. Record the year, the identity of the account and the candidate special apportionment method (call them the preferred year, the preferred account and the preferred special apportionment method), and ii. Set the minimum tax liability encountered so far to be equal to the tax liability from (ii).

d. If the minimum liability encountered is lower than the current liability, (i) Set the current special apportionment method of the preferred account in the preferred year to be equal to the preferred special apportionment method.

(ii) Set the current tax liability to be equal to the minimum tax liability encountered.

(iii) Go back to step (c).

e. Else, exit and return the current special apportionment methods to the user (they describe the optimal solution).

In one example embodiment, the optimizer 335 may return the results of the optimization run in as an example vector object. An example vector object may include components as shown below.

int[year][state][account] salesBestMethod: The ID of the best special apportionment method for each account in the sales factor.

int[year][state][account] propertyBestMethod: The ID of the best special apportionment method for each account in the property factor.

int[year][state][account] payrollBestMethod: The ID of the best special apportionment method for each account in the payroll factor.

int[year][state][account] userFactorBestMethod: The ID of the best special apportionment method for each account in the user-defined factor.

double[year][state] savings: For each year, the savings achieved in each state.

double[state] totalSavings: For each state, the sum of the savings achieved across years.

A Hashtable with some summary statistics (keys are String, values are Double).

Figure 15:
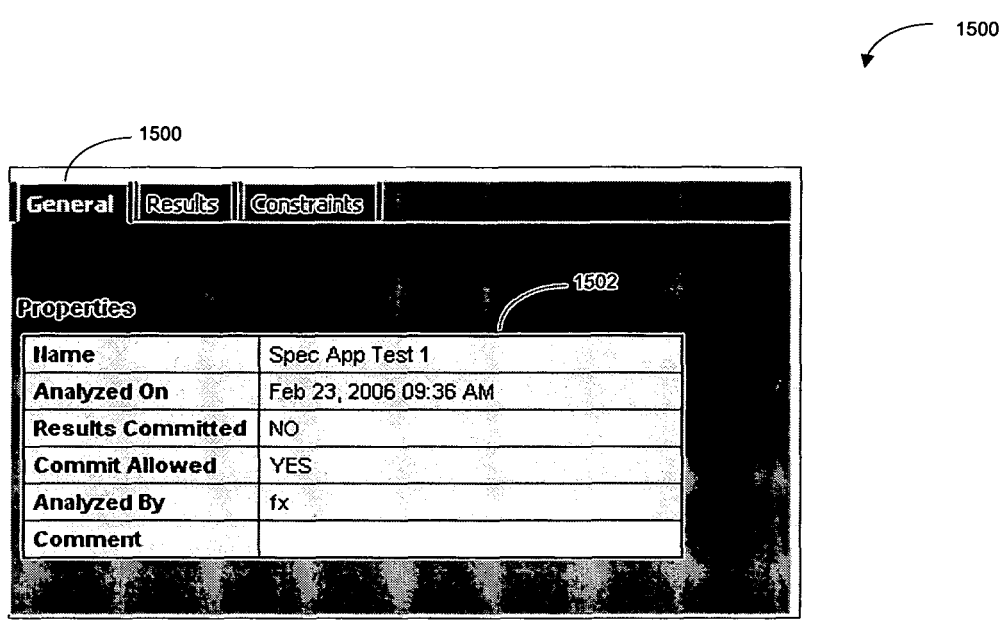
Figure 17:
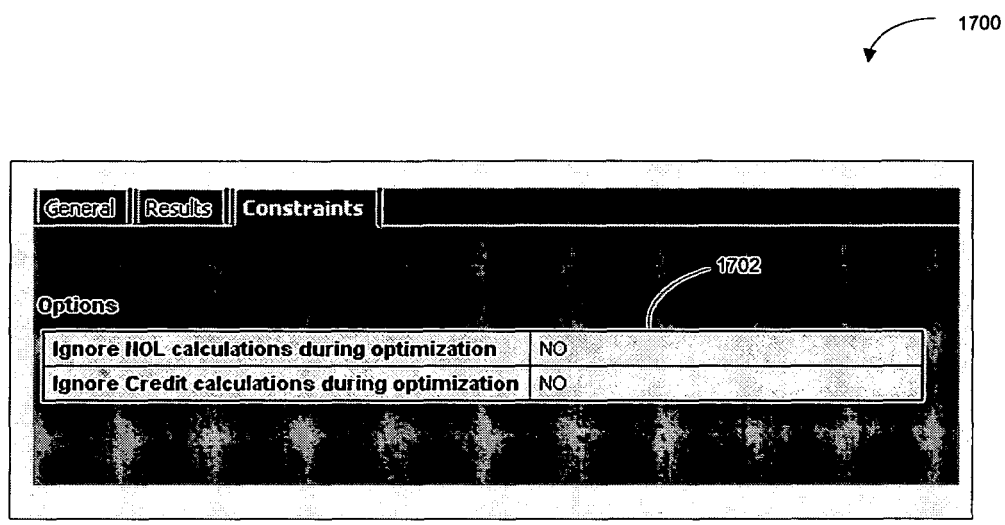

FIGS. 15-17 illustrate how the optimizer results are presented to the user in the UI, according to one example embodiment. The results may be displayed in three tabs.

The first tab, "General," illustrated in FIG. 15, reports a number of properties of the optimization run, displayed in area 1502, such as analysis name, date, etc, that can be used to verify the execution or other properties of the optimization run.

The second tab, "Results," illustrated in FIG. 16, reports the actual results of the optimization run. The top table reports a number of summary statistics in area 1602. The bottom table 1604 reports, for each jurisdiction, the suggested special apportionment method for each special apportionment account in the industries being optimized. The user may be able to view the results separately for each year by selecting a year in the drop-down menu 1606 at the top of the screen. The last row in the example table 1604 displays total savings across all jurisdictions in the year considered (as the sum of the values of the items in the table 1604). Cells where changes in special apportionment methods are proposed may be highlighted, e.g., by a thick border or highlighted color, on the screen. Each row (except the total row) may include a checkbox that allows the user to select the results to be committed. When the user clicks on the "Apply" button 1608 at the bottom of the screen, the results are committed for the selected jurisdictions in all scenario years, e.g. written to the scenario and persisted in a database. The user may be permitted to request a commit operation several times (e.g., once per jurisdiction).

The third tab, "Constraints," illustrated in FIG. 17, displays, in an area 1702, a sample of the user options and constraints that were used in the optimization run.

Figure 18:
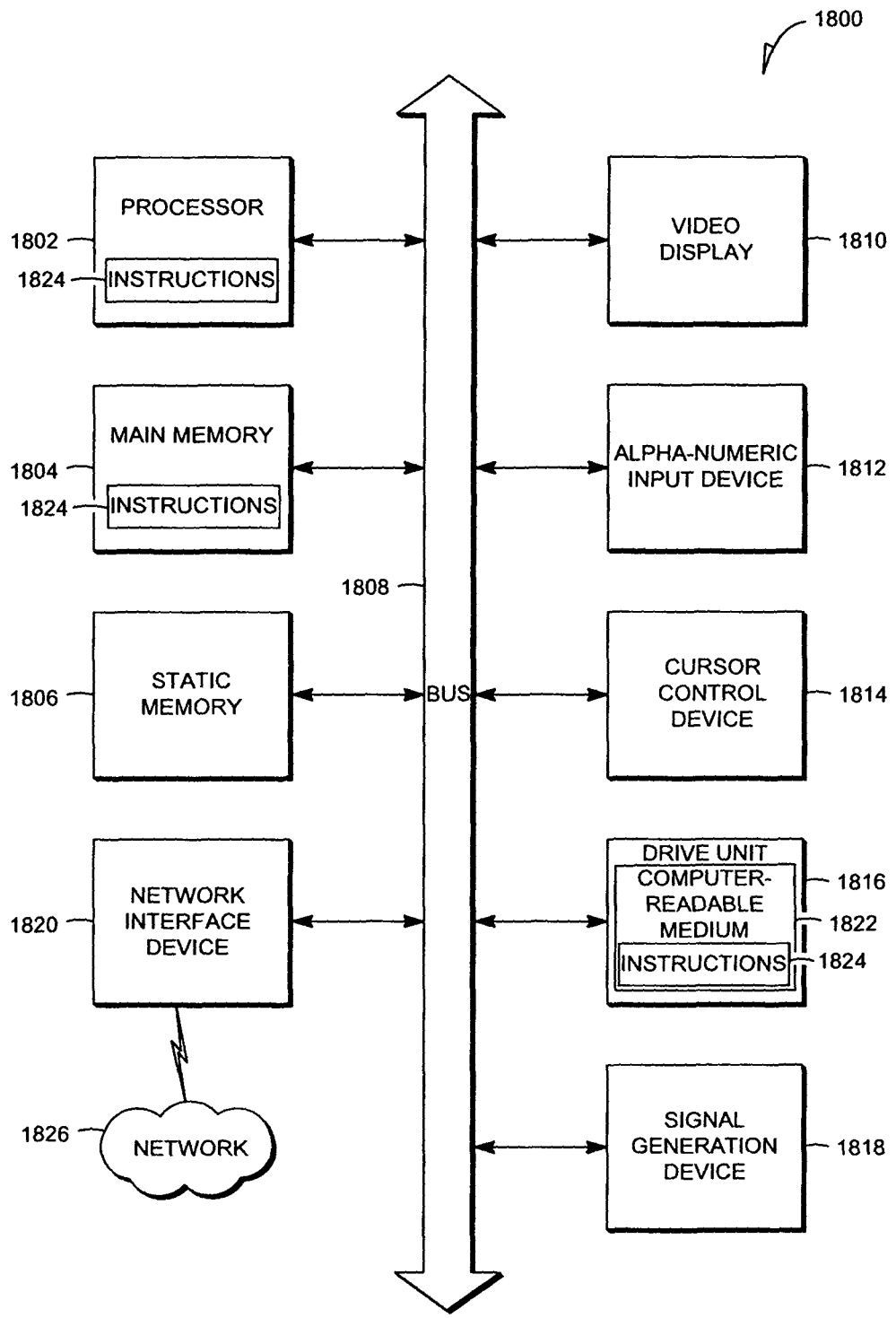
FIG. 18 is a diagrammatic representation of an example machine in the form of a computer system within which a set of instructions, for causing the machine to perform any one or more of the methodologies discussed herein, may be executed.

FIG. 18 shows a diagrammatic representation of a machine in the example form of a computer system 1800 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as a "Moving Picture Experts (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alpha-numeric input device 1812 (e.g., a keyboard), a user interface (UI) navigation device 1814 (e.g., a cursor control device), a disk drive unit 1816, a signal generation device 1818 (e.g., a speaker) and a network interface device 1820.

The disk drive unit 1816 includes a machine-readable medium 1822 on which is stored one or more sets of instructions and data structures (e.g., software 1824) embodying or utilized by any one or more of the methodologies or functions described herein. The software 1824 may also reside, completely or at least partially, within the main memory 1804 and/or within the processor 1802 during execution thereof by the computer system 1800, the main memory 1804 and the processor 1802 also constituting machine-readable media.

The software 1824 may further be transmitted or received over a network 1826 via the network interface device 1820 utilizing any one of a number of well-known transfer protocols (e.g., Hyper Text Transfer Protocol (HTTP)).

While the machine-readable medium 1822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of embodiments of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system to determine state income tax liability have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A system for preparing a tax filing, the system comprising:
 a processor, a first memory comprising a non-transitory computer readable medium, and a second memory comprising a non-transitory computer readable medium;
 a data collector module, comprising a set of executable code stored in the first memory and when executed by the processor configured to:
  obtain from a first database information associated with an account, and
  obtain from a second database a selection of one or more jurisdictions;
 an optimizer module, comprising a set of executable code stored in a second memory and when executed by the processor configured to automatically determine a suggested special apportionment method for each jurisdiction to generate by a computer a signal comprising a suggested combination of special apportionment methods for the account to be used for preparing a tax or information return or other tax filing, the optimizer module adapted to return a hashtable and a vector object, the hashtable comprising a set of summary statistics, the vector object comprising one or more of salesBestMethod, propertyBestMethod, payrollBestMethod, userFactorBestMethod, savings, and totalSavings, and wherein the suggested special apportionment methods are determined by the formula:

$$(X*Y)/Z$$

wherein X represents a user-defined factor, Y represents a numerator associated with each jurisdiction, and Z represents a denominator associated with a current special apportionment method, and wherein special apportionment methods associated with flow-through entities are performed at the flow-through entity level; and
 a graphical user interface comprising a set of user interface elements adapted to receive a user input and generate a signal representing a jurisdiction based special apportionment method for the account to be used for preparing the tax or information return or other tax filing.

2. The system of claim 1, wherein the suggested combination of special apportionment methods is associated with the lowest taxable amount from one or more taxable amounts generated utilizing one or more other combinations of special apportionment methods.

3. The system of claim 1, further comprising a display module to generate presentation information for viewing by a user, utilizing the suggested combination of special apportionment methods, the presentation information comprising a taxable amount associated with a jurisdiction from the one or more jurisdictions.

4. The system of claim 1, wherein the information associated with the account comprises account name, industry, factor, and value.

5. The system of claim 1, wherein the account is from a plurality of accounts associated with an industry.

6. The system of claim 1, wherein the optimizer is to determine the suggested special apportionment method for each jurisdiction for each year from a plurality of years.

7. The system of claim 1, wherein the data collector is to obtain a selection of one or more parameters for each jurisdiction from the one or more jurisdictions, and wherein the optimizer is to determine the suggested special apportionment method for each jurisdiction utilizing the selection of the one or more parameters.

8. The system of claim 7, wherein a parameter from the selection of the one or more parameters comprises an exclusion parameter.

9. The system of claim 7, wherein:
an account is from a plurality of accounts; and
a parameter from the selection of the one or more parameters is to indicate that the suggested combination of special apportionment methods is to be consistent across accounts from the plurality of accounts.

10. The system of claim 7, wherein a parameter from the selection of the one or more parameters is to indicate that the suggested combination of special apportionment methods is to be consistent across all years associated with the account.

11. A computer-implemented method for preparing a tax filing, the method comprising:
determining by a computer obtaining from a first database information for an account;
for the account, determining by a computer obtaining from a second database one or more jurisdictions;
automatically, by a computer executing software stored as executable code in a non-transitory memory to process account and jurisdiction related data, determining a suggested special apportionment method for each determined jurisdiction to generate by a computer a signal comprising a suggested combination of special apportionment methods for the account to be used for preparing a tax or information return or other tax filing, returning automatically by the computer executing software a hashtable and a vector object, the hashtable comprising a set of summary statistics, the vector object comprising one or more of salesBestMethod, propertyBestMethod, payrollBestMethod, userFactorBestMethod, savings, and totalSavings, and, wherein the suggested special apportionment methods are determined by the formula:

$$(X*Y)/Z$$

wherein X represents a user-defined factor, Y represents a numerator associated with each jurisdiction, and Z represents a denominator associated with a current special apportionment method, and wherein special apportionment methods associated with flow-through entities are performed at the flow-through entity level; and
displaying a graphical user interface comprising a set of interface elements adapted to receive a user input and generate a signal representing a selected jurisdiction based special apportionment method for the account to be used for preparing a tax or information return or other tax filing.

12. The method of claim 11, wherein the suggested combination of special apportionment methods is associated with the lowest taxable amount from one or more taxable amounts generated utilizing one or more other combinations of special apportionment methods.

13. The method of claim 11, further comprising generating presentation information for viewing by a user, utilizing the suggested combination of special apportionment methods, the presentation information comprising a taxable amount associated with a jurisdiction from the one or more jurisdictions.

14. The method of claim 11, wherein the information associated with the account comprises account name, industry, factor, and value.

15. The method of claim 11, wherein the account is from a plurality of accounts associated with an industry.

16. The method of claim 11, wherein the determining of the suggested special apportionment method for each jurisdiction comprises generating a suggested combination of special apportionment methods for each year from a plurality of years.

17. The method of claim 11, further comprising obtaining a selection of one or more parameters for each jurisdiction from the one or more jurisdictions, wherein the determining of the suggested special apportionment method for each jurisdiction comprises utilizing the selection of the one or more parameters.

18. The method of claim 17, wherein a parameter from the selection of the one or more parameters comprises an exclusion parameter.

19. The method of claim 17, wherein:
an account is from a plurality of accounts; and
a parameter from the selection of the one or more parameters is to indicate that the suggested combination of special apportionment methods is to be consistent across accounts from the plurality of accounts.

20. The method of claim 17, wherein a parameter from the selection of the one or more parameters is to indicate that the suggested combination of special apportionment methods is to be consistent across all years associated with the account.

21. A non-transitory machine-readable medium for preparing a tax filing having instruction data stored as a set of executable code on the machine-readable medium and when executed by a processor configured to cause a machine to:
obtain from a first database information associated with an account;
obtain from a second database a selection of one or more jurisdictions;
determine by a computer by executing a set of code stored in the non-transitory machine-readable medium and executed by a processor a suggested special apportionment method for each jurisdiction to generate by a computer a signal comprising a suggested combination of special apportionment methods for the account to be used for preparing a tax or information return or other tax filing, returning automatically by the computer executing software a hashtable and a vector object, the hashtable comprising a set of summary statistics, the vector object comprising one or more of salesBestMethod, propertyBestMethod, payrollBestMethod, userFactorBestMethod, savings, and totalSavings, and, wherein the suggested special apportionment methods are determined by the formula:

$$(X*Y)/Z$$

wherein X represents a user-defined factor, Y represents a numerator associated with each jurisdiction, and Z represents a denominator associated with a current special apportionment method, and wherein special apportionment methods associated with flow-through entities are performed at the flow-through entity level; and
present a graphical user interface comprising a set of interface elements and adapted to receive a user input and generate a signal representing a selected jurisdiction based special apportionment method for the account to be used for preparing a tax or information return or other tax filing.

22. A system for preparing a tax filing, the system comprising:
- means for determining information for a special apportionment account;
- means for determining one or more jurisdictions for the special apportionment account;
- means for automatically determining a suggested special apportionment method for each determined jurisdiction to generate by a computer a signal comprising a suggested combination of special apportionment methods for the account to be used for preparing a tax or information return or other tax filing, and for automatically returning a hashtable and a vector object, the hashtable comprising a set of summary statistics, the vector object comprising one or more of salesBestMethod, propertyBestMethod, payrollBestMethod, userFactorBestMethod, savings, and totalSavings, and, wherein the suggested special apportionment methods are determined by the formula:

$$(X*Y)/Z$$

wherein X represents a user-defined factor, Y represents a numerator associated with the account, and Z represents a denominator associated with a current special apportionment method, and wherein special apportionment methods associated with flow-through entities are performed at the flow-through entity level; and
- means for displaying a graphical user interface comprising a set of interface elements adapted to receive a user input and generate a signal representing a selected jurisdiction based special apportionment method for the account to be used for preparing a tax or information return or other tax filing.

* * * * *